US008700804B1

(12) United States Patent
Meyers et al.

(10) Patent No.: US 8,700,804 B1
(45) Date of Patent: Apr. 15, 2014

(54) METHODS AND APPARATUS FOR MANAGING MOBILE CONTENT

(75) Inventors: Peter William Meyers, West Chester, PA (US); John Henry Thompson, Merion Station, PA (US)

(73) Assignee: EP Visual Design, Inc., West Chester, PA (US)

( * ) Notice: Subject to any disclaimer, the term of this patent is extended or adjusted under 35 U.S.C. 154(b) by 478 days.

(21) Appl. No.: 13/049,435

(22) Filed: Mar. 16, 2011

(51) Int. Cl.
*G06F 15/16* (2006.01)

(52) U.S. Cl.
USPC .......................................... 709/248; 709/217

(58) Field of Classification Search
USPC .................................. 709/217, 218, 219, 248
See application file for complete search history.

(56) References Cited

U.S. PATENT DOCUMENTS

| | | | |
|---|---|---|---|
| 6,574,617 B1* | 6/2003 | Immerman et al. .................... 1/1 |
| 6,742,026 B1* | 5/2004 | Kraenzel et al. ............. 709/222 |
| 6,785,721 B1* | 8/2004 | Immerman et al. .......... 709/220 |
| 6,845,383 B1* | 1/2005 | Kraenzel et al. ....................... 1/1 |
| 6,854,016 B1* | 2/2005 | Kraenzel et al. ............. 709/229 |
| 7,219,304 B1* | 5/2007 | Kraenzel et al. ............. 715/755 |
| 7,304,570 B2* | 12/2007 | Thomas et al. .......... 340/539.11 |
| 7,360,082 B1* | 4/2008 | Berthold et al. ............. 713/157 |
| 2002/0112162 A1* | 8/2002 | Cocotis et al. ............... 713/176 |
| 2004/0003031 A1* | 1/2004 | Brown et al. ................. 709/203 |
| 2004/0003345 A1* | 1/2004 | Brown et al. ............. 715/501.1 |
| 2004/0201604 A1* | 10/2004 | Kraenzel et al. ............... 345/700 |
| 2005/0091340 A1* | 4/2005 | Facemire et al. ............. 709/218 |
| 2006/0069746 A1* | 3/2006 | Davis et al. .................... 709/218 |
| 2007/0174324 A1* | 7/2007 | Palapudi et al. .............. 707/102 |
| 2013/0238975 A1* | 9/2013 | Chan et al. ..................... 715/234 |

* cited by examiner

*Primary Examiner* — Douglas Blair
(74) *Attorney, Agent, or Firm* — Baker & Hostetler LLP

(57) ABSTRACT

A mobile application platform enables a user of a mobile device to manage Personalized Offline Web Applications (POW Apps) on a variety of devices. A Virtual Directory (VD) technology that is multi-source capable permits the POW code and content to be variably localized (Developer/User controls POW content/code stored on the user's device). The end user enters login information into a mobile application that is using the engine of the mobile application platform and receives POW code and content individually configured to the end user. A content manager or publisher controls what aspects of the POW application are stored locally and what aspects are kept on the server. When content is requested that is not stored locally, the content is either downloaded and opened locally or accessed on the web server like in the case of a streaming video or audio. After viewing any portion of the video or audio file, the user can decide to download the entire video or audio for offline use. The user is given this option or the content developer can predetermine how different types of POW code and content are handled through configuration settings. In addition to accessing or downloading online content, periodic communication back to the mobile application platform cloud can be implemented to get updates to the content and report back user activity, such as test scores and usage statistics.

14 Claims, 9 Drawing Sheets

METHODS AND APPARATUS FOR MANAGING MOBILE CONTENT

TECHNICAL FIELD

The invention relates to a mobile data management system and method that enables a user of a system for providing data to mobile devices to designate whether functional code and/or media content should be stored locally or remotely and to automatically check for updates as needed.

BACKGROUND

The use of mobile computing devices has exploded in recent years. Users now may download a wide variety of mobile software applications to their smart phones and other mobile computing devices and access data on the Internet through Wi-Fi, Bluetooth, CDMA, and other communications protocols. However, users of such devices do not have unlimited access to the Internet as access is limited to the available connection modality in particular geographic locations and the cost of data downloads over these networks may be prohibitive. Also, the users of such devices are limited to the mobile software applications loaded onto their mobile devices or to new mobile software applications and content updates of the existing mobile software applications that may be readily loaded onto their mobile computing devices over an available Internet connection. Generally, such mobile software applications are available as content on a web-based server and are available for download by the user once a suitable Internet connection is available and appropriate download permissions are obtained.

Generally speaking, users are not given the opportunity to designate in advance what content the user would like to store locally on his or her mobile computing device and what mobile content is best accessible via an Internet connection. Though some caching is provided by the browser of a mobile computing device, an Internet connection is generally required to operate many mobile software applications that require access to data or functional code available only via an Internet connection. For example, a particular mobile software application may require a segment of Javascript code to operate and may need to download the code to display certain data.

Existing systems address the downloading of mobile software applications by enabling the user of the mobile computing device to sync to another computer for downloading of any critical functional and/or content data not stored on the mobile computing device. However, such systems do not necessarily know whether the downloaded data has an on-line component and thus may require Internet access to operate. If Internet access is unavailable, use of the particular mobile software application becomes impossible. In such cases, the mobile computing device cannot be used off-line as access to all of the functional code is required for execution. Users do not have control over which code and which portions of content may be stored locally versus remotely; therefore, operation of their devices is limited by the availability of an Internet connection.

It is thus desired to enable a user or content manager/publisher to designate what mobile software application functional code and data are to be stored locally on the user's mobile computing device to enable complete off-line operation versus those portions of mobile software application functional code and data that are stored for access via an Internet connection. Such designations by the user or content manager/publisher would maximize the utility of the user's mobile computing device in off-line situations. It is also desirable for the content manager/publisher to be able to assign different content to different users or groups of users.

SUMMARY

The invention addresses the above-mentioned and other limitations of the prior art by providing a mobile device software platform for user and/or content manager/publisher management of what mobile application software code and features are available on-line versus off-line and that automatically checks for updates of off-line code for regular updates as needed. In particular, the user and/or content manager/publisher are given the ability to specify where media and functional code is stored and to maintain a virtual file directory. The platform of the invention is particularly useful in a cloud computing environment where numerous servers may contain the needed mobile application software and mobile data.

In exemplary embodiments, the invention includes on the client side a mobile application engine loaded onto the user's mobile computing device for designating and managing personalized off-line web applications as well as a virtual directory that enables the user to manage data storage over multiple data sources and for updating of localized data based on the user's designations. On the server side, the system includes a validation server that validates the user's credentials to enable access to the on-line data, a usage server that maintains usage statistics and reports such statistics to the user, and content server(s) that deliver requested content files including web pages, web scripted code, and media files to the user. The content manager/publisher may also designate whether certain data and applications are to remain on the server or may be downloaded to the client.

The mobile application platform of the invention enables a user of a mobile device to manage Personalized Offline Web Applications (POW Apps) on a variety of devices. A locally maintained directory identifies which of many sources to be accessed for updates and permits the POW code and content to be variably localized (Developer/User controls POW content/code stored on the user's device). The user enters login information into a mobile application that is using the engine of the mobile application platform and receives POW code and content individually configured by the manager of the content. The user or the content manager/publisher controls what aspects of the POW application are stored locally and what aspects are kept on the server. When content is requested that is not stored locally, the content is either downloaded and opened locally or accessed on the web server as in the case of a streaming video or audio. After viewing any portion of the video or audio file, the user can decide to download the entire video or audio for offline use. The user is given this option or the content developer/publisher can predetermine how different types of POW code and content are handled through configuration settings. In addition to accessing or downloading online content, periodic communication back to the mobile application platform cloud can be implemented to get updates to the content and report back user activity, such as test scores and usage statistics.

BRIEF DESCRIPTION OF THE DRAWINGS

The above and other features and advantages of the invention will be apparent from the following detailed description of the figures, of which.

DETAILED DESCRIPTION OF ILLUSTRATIVE EMBODIMENTS

Figure 1:
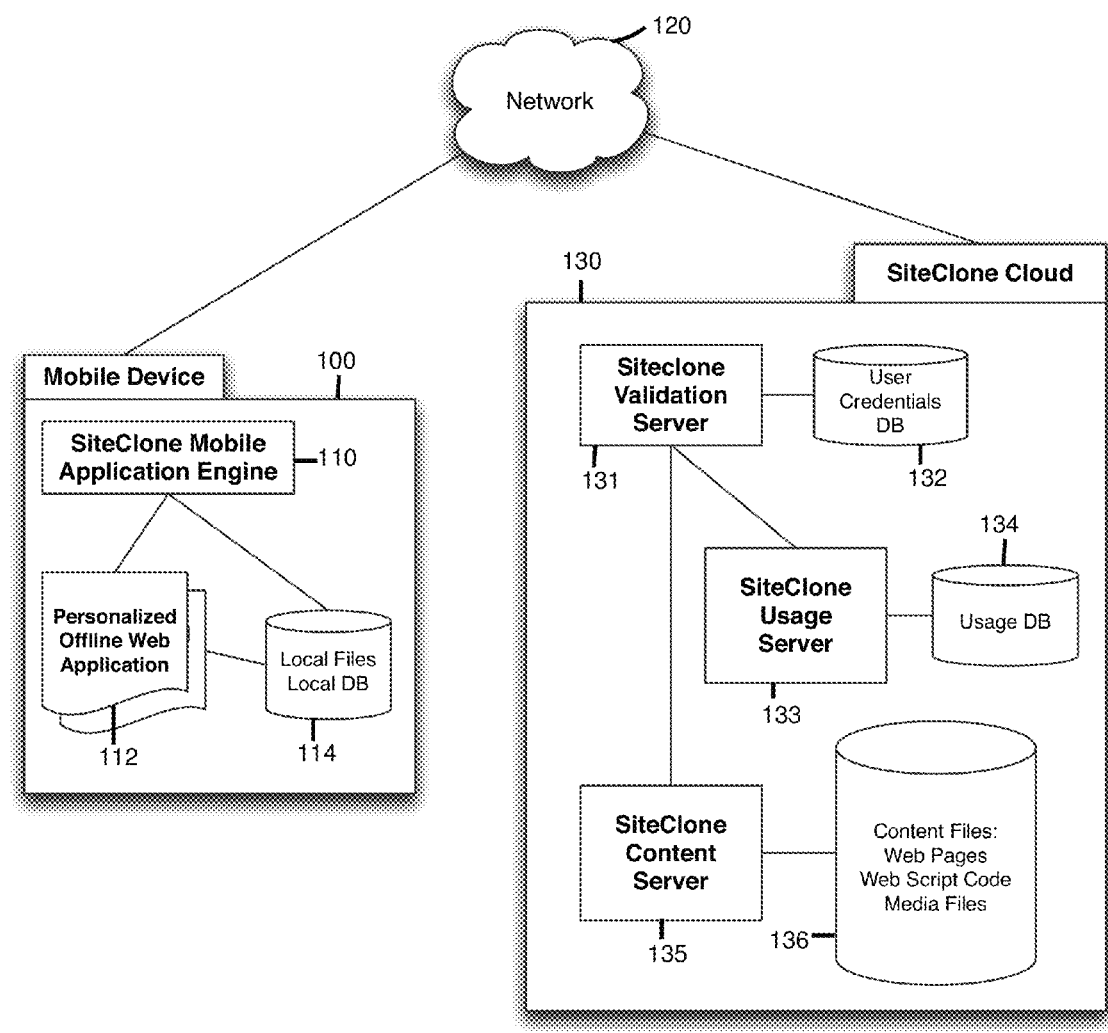
FIG. 1 illustrates the implementation of a mobile data management system for managing data content for off-line and on-line use in accordance with the invention.

Certain specific details are set forth in the following description with respect to FIGS. 1-9 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

The system and method described below with respect to FIGS. 1-9 is designed to deliver Personalized Offline Web Applications (POW Apps) to a variety of devices via a network and to manage use of such POW Apps. The system and method described herein may be used to create, distribute and manage POW Apps, including performing such functions as content management on a server, content management by an end-user on a mobile computing device, secure delivery of web applications to a mobile computing device, intelligent syncing between server content and a mobile computing device, and resilience to unreliable network communication. Such Personalized Offline Web Applications (POW Apps) are the end-user's window into the content. In an exemplary embodiment, the POW Apps include web pages (HTML, CSS), web scripts code (e.g., Javascript), media files (video and audio), and doc files such as word, spreadsheets, and presentations. In accordance with the invention, the web scripts include what will be referred to herein as API calls or "web verbs" that provide extensions to web scripting that may be invoked by POW App scripting code to customize the POW Apps. For example, a sample call from Javascript would be presented as:

function delete_file(filename)
{
document.location="verb://?delete_file=filename";
}

Such web verbs activate custom code in a mobile application engine of the mobile computing device so as to give the POW Apps the ability to provide fine control over audio/video playback, control navigational overlay, control secondary web pages, and manage (i.e. update and remove) local content. For example, a POW App downloaded onto the user's mobile computing device in accordance with the invention allows users to download websites or portions of websites for which they have FTP access. The loaded POW App permits entire static websites or individual web pages and media to be viewed offline, including videos, images, documents, and the like. Site owners can brand their sites by adding custom configuration settings that may be used by such POW Apps on the users' mobile computing devices to tailor the users' experiences. For example, such customization options include modifying the background of the main screen and incorporating HTML files throughout. Such customizable POW Apps are implemented by a system of the type shown in FIG. 1.

In the system of FIG. 1, the user logs on to the server 130 via the mobile computing device 100 and network 120 and accesses contents individually configured in the form of a web application and rich media. In exemplary embodiments, the main interaction is offline, with periodic communication back to the server 130 to get recent updates to the content and report back user activity, such as test scores and usage statistics. In an exemplary embodiment, application engine 110 loaded onto the mobile computing device 100 is built on Internet standards to deliver Personalized Offline Web (POW) applications to the mobile computing devices from one or more of a family of servers 130 that are static HTML and/or dynamic web service servers configured to manage metadata associated with the POW Apps. Such metadata includes mobile application parameters, user controlled settings, and Javascript initiated application commands (referred to herein as "web verbs") that allow the user to specify the applications and content that is to be stored locally on the mobile computing device 100 versus remotely on the server 130 and to specify the update intervals for updating the offline data and applications.

FIG. 1 illustrates the implementation of a mobile data management system for managing data content for off-line and on-line use in accordance with the invention. The client side mobile computing device 100 includes a mobile application engine 110 that enables user management of POW Apps 112 and user management of local data files in a local database 114 for use with the POW Apps in accordance with the invention. The mobile application engine 110 is implemented as software that runs on the mobile computing device 100 and communicates with one or more cloud servers 130 and loads and runs one or more POW Apps. As noted above, such POW Apps include, e.g., web pages (HTML, CSS), web scripting code (e.g., Javascript), and a variety of media files (video, audio, docs). The mobile application engine 110 is compiled for the operating system (OS) of the mobile computing device 100 and functions to implement custom file extensions that are available to the web scripting code ("web verbs") in the POW Apps, management of the virtual directory system, security, file syncing, log file uploading and media streaming.

As illustrated in FIG. 1, the mobile computing device 100 is connected via a communications network 120 to a server (e.g., cloud server) 130 for on-line access to web applications and stored data content. The server 130 may include several servers that may be housed on one physical computer server 130 or distributed across physical servers in a cloud configuration to meet scaling performance goals. In the embodiment of FIG. 1, server 130 includes a validation server 131 that validates the user's credentials and/or the user's application against a user credentials database 132. The validation server 131 is the entry point from the mobile application engine 110 into the server 130. The end-user credentials, which could be user name and password, are validated and the POW App metadata is returned to the mobile application engine 110. The metadata provides references to the files on the server 130 that make up the POW App and configuration settings. The configuration settings typically come from server 130 and may be set by scripting code in the POW App. In an exemplary embodiment, such configuration settings include a content expiration date, a content update interval, and POW App specific key-value pairs. During use, the mobile application engine 110 downloads the initial content, which, as noted above, typically comprises web pages, web scripts, and media files. After the initial download, the POW App itself may also communicate with server 130.

The server 130 also includes a usage server 133 for managing user access to a usage database 134. The POW App can be configured to report back usage statistics to the usage server 133 for storage in the usage database 134. The stored usage data may include, for example, the results of test scores, viewing activity, or POW App custom data in the form of key-value pairs.

The server 130 further includes a content server 135 that delivers any of the content files from content database 136 to the mobile computing device 100. The content files stored in content database and/or repository 136 may include HTML web pages, Javascript, CSS, media files, and the like that can be developed by the content developer and include the aforementioned web verbs (functions) to control the POW app. Generally, the content manager/publisher uploads the content files to the content database and/or repository 136 of the server 130 that the content manager/publisher wants the end user to download and keep synchronized. As will be explained in more detail below, the compiled mobile applications offline data management feature of the mobile application engine 110 intelligently manages this content for localized access and gives the content manager/publisher of server 130 the tools to manage the content and to implement end user content management features. Users may implement the mobile application engine 110 to clone all or parts of the web site containing the content and to access and manage a virtual file directory on the user's mobile computing device 100. The virtual file directory on the user's mobile computing device 100 identifies content from multiple sources and gives the user control and management over access to those multiple sources for updating the localized content using the techniques described herein. The users may also see stored files that have not yet been synchronized.

The content manager/publisher preferably prepares server 130 for communicating and providing content files from content database 136 to the mobile application engine 110 in each mobile computing device 100 by setting up the server 130 to support a variety of setup options including (1) simple FTP, (2) FTP including user authentication, logging, device ID filtering, and server side parameters, (3) simple HTTP(s) using static files, (4) HTTP(s) using PHP generated file lists and server parameters, or (5) advanced HTTP(s) including user authentication, logging, device ID filtering and server side parameters.

Those skilled in the art will appreciate that the communications between the mobile computing device 100 and server 130 are based on access protocols for the server 130. For example, the communications are typically built on web standards (e.g., FTP, HTTP, HTTPS) that support efficient validation and delivery and synchronization over secure or non-secure connections. The content can be delivered in a mix of secure and non-secure sources for efficiency, and the server host can be a static or dynamic configuration. The exemplary communication protocol also supports continuation of interrupted downloads as well as the detection of out of date content using file size, date, etc. The exemplary communication protocol also supports author designated deferred content whereby an end-user may elect to download later.

During operation, a list of available files is generated by the POW developer and interpreted by the server 130 when running the POW App. The file list contains a list of available files along with augmented file attributes that dictate the handling of the file. The file list is typically generated from a set of rules on the server 130 as specified by the content manager/publisher and a list of files from the native file system on the server 130. The augmented file attributes may be attached to the associated file or sent as a separate text file that is linked to the content file by the file system or in a standard location relative the root of the content repository. The file attributes may also be extracted from file headers and built dynamically. In an exemplary embodiment, the following augmented file/directory attributes may be used in a typical system configuration:

filePath: local relative path name for file;
remote source: optional relative or full http/https path to file;
source-credentials: optional credentials used to access source;
size: size of file in bytes;
mod-date: modification date and time;
checksum: code based on content of file used to validate;
unique-tag: unique tag used to detect new file;
deferred: should file be downloaded as referenced: YES/NO;
compressed: is the file stored in compressed format: YES/NO;
encoded: is file source encoded for additional level of security: YES/NO;
to be encoded: file is to be encoded before it is stored: YES/NO;
stream: media is available to be streamed from the server;
allow emailing: file can be emailed;
expire file: date the file should no longer be available for viewing;
allow printing: file can be printed by the user;
allow remote deletion: allow the user to delete the file from the server;
allow local deletion: allow the file to be deleted on the mobile device; check for update interval: every time, every X hours/days;
open with: specify the compiled application interface the file can be opened in;
allow open: allow the file to be open using other mobile applications; and
viewlog: interval log file stored on mobile device is uploaded to server (account wide setting only).

Figure 2:
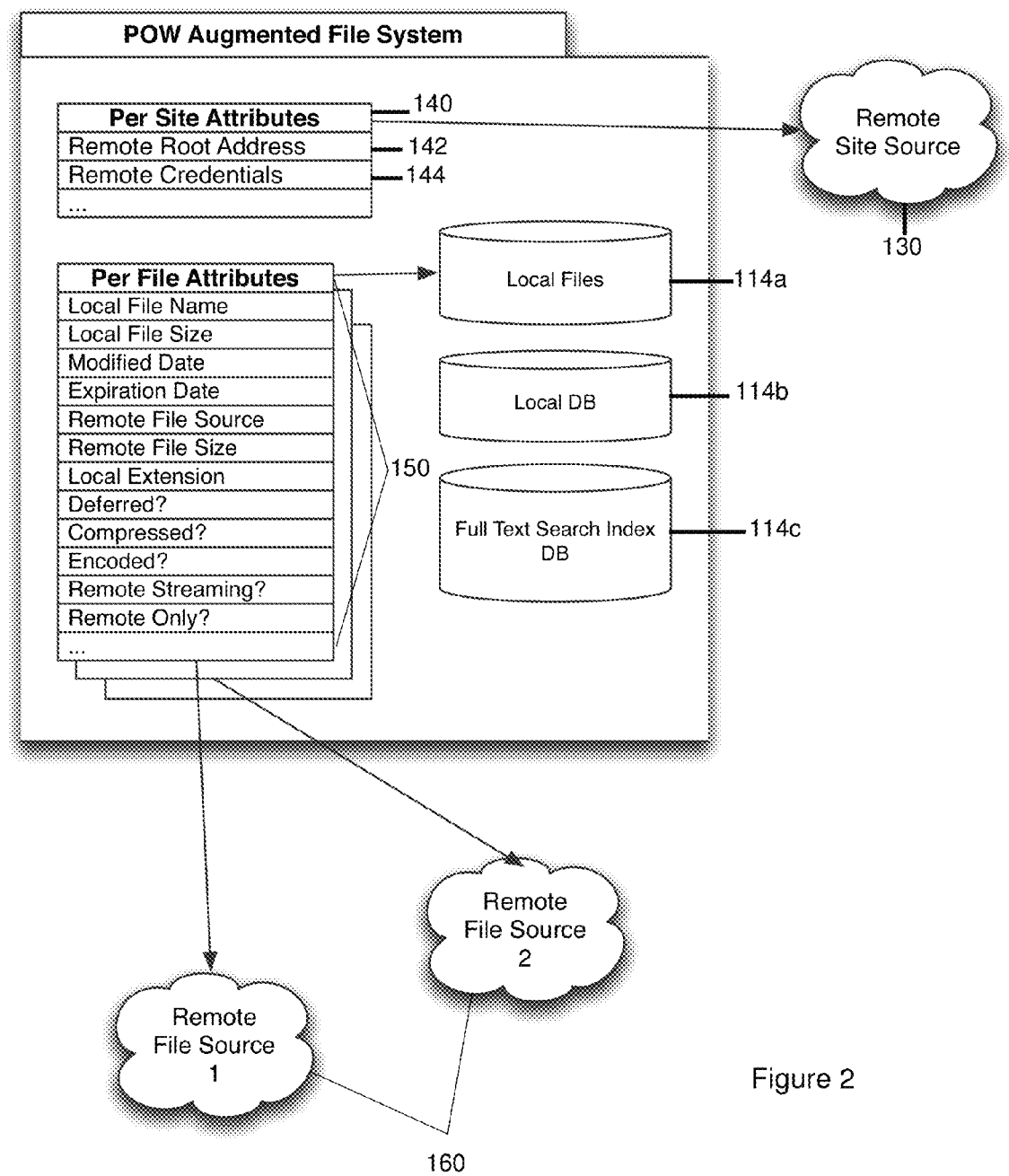
FIG. 2 illustrates the augmented file system implemented on the mobile device for tracking files in accordance with the invention.

FIG. 2 illustrates the augmented file system implemented on the mobile device for tracking files in accordance with the invention. The augmented file system manages the local store of files in database 114 of mobile device 100 as such files are downloaded from the remote store (e.g., server 130). As illustrated, per site attributes 140 that are tied to a particular server 130 include a remote root address 142 that is the absolute remote address for the server 130. Local relative addresses are resolved using this root address to form the absolute address needed to download a file. The per site attributes 140 also include remote credentials 144 including, for example, the user name and password needed to access the remote source. Several other site attributes may be used by the mobile application engine 110 to control how a site is presented on the mobile device 100. The per file attributes 150 include conventional file attributes that are unique to individual files as well as augmented file attributes of the type mentioned above. For example, Modified Date may be used to keep the local copy of the file in sync with the remote source file. Expiration Date may be used to specify when the local copy must be updated from the remote source. Remote File Source may be used to provide an optional absolute reference to the remote server. If absent, the Remote Root Address of the site is used to form the remote address of the file from the local relative address as described above. Local Extension permits a local version of a file to be given an optional new extension. "Deferred?" indicates whether the file should be downloaded when referenced by the end user rather than as part of the site wide update operation. "Compressed?" indicates whether the file is compressed for download, and "Encoded?" indicates if the file should be stored locally in an encoded format for additional security. "Remote Streaming?" indicates if the file should be streamed from the remote source for previewing and is typically used for movie and audio media files. "Remote Only?" indicates that the file should always be accessed from the remote address rather than stored locally. Of course, other file attributes such as those noted above may be implemented as desired to implement the functionality described herein.

Importantly, the augmented file attributes of per file attributes 150 enable the user and/or content manager publisher to designate whether the associated file is to be downloaded or download deferred for later access as well as where to go to get the file when it is needed. The local file system on the mobile device 100 thus indicates in its file list whether a file is stored locally or on a remote server and whether the remote servers require any special instructions (e.g., specific security parameters). The local file system may be a typical flat file database including file listings and file attributes extracted from other sources. For example, the per file attributes 150 for a particular file may receive attributes from another server specifying that access to a file is to be deferred and provide a pointer to a remote file source 160 for accessing the file when it is needed during processing, as well as an expiration date for such access. The per file attributes are stored with the local files 114a/local database 114b. A full text search index database 114c may also be provided to facilitate searching of the stored files.

Figure 3:
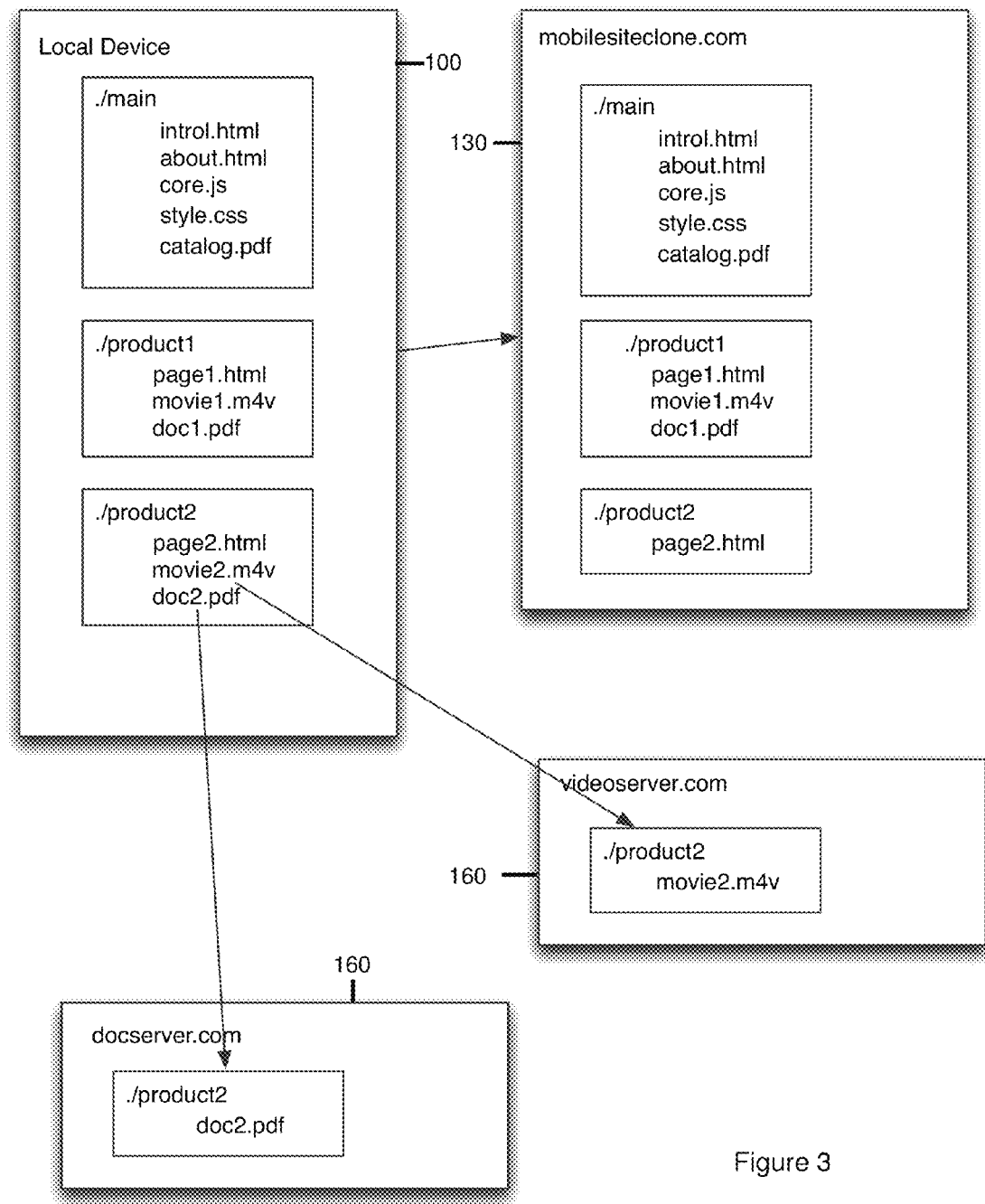
FIG. 3 illustrates a file list example of implementation of the augmented file system on a mobile device in accordance with the invention.

FIG. 3 illustrates a file list example of implementation of the augmented file system on a mobile device in accordance with the invention. In this example, the files are obtained from source server 130 (http://mobilesiteclone.com) and stored on the local device 100 in the following layout:
./main
  intro.html
  about.html
  core.js
  style.css
  catalog.pdf
./product1
  page1.html
  movie1.m4v
  doc1.pdf
./product2
  page2.html
  movie2.mv4
  doc2.pdf As illustrated in FIG. 3, not all of these files are necessarily provided by mobilesiteclone.com. The video file movie2.m4v is available on the server videoserver.com, while the document doc2.pdf is available at server docserver.com. In the exemplary embodiment, these latter two files are not downloaded to the mobile device 100 with the other files but are instead accessed at runtime when internet connectivity is available. As will be explained below, the augmented file attributes are associated with the files movie2.m4v and doc2.pdf and processed by mobile application engine 110 to enable this functionality.

In the example illustrated in FIG. 3, the content developer may make the following decisions about the behavior of the POW App including the identified files and set the augmented file attributes accordingly:
  The large file catalog.pdf is used by a few users, so it is not installed with the POW app. Instead, it will be downloaded when a user touches a link that references it from the intro or about html files.
  The files in directory product1 should always be needed by the user, and for efficiency the entire directory is compressed.
  The files in directory product2 are large and not needed by most users so they will only be downloaded when the user refers to them from a link or activates a button that runs custom script that explicitly downloads them.
  The large video file ./product2/movie2.mv4 will be delivered from another server (videoserver.com) designed to better deal with streaming large video files.
  The document ./product2/doc2.pdf will be delivered from a secure server (docserver.com).

Based on these decisions, the following file list is generated for the POW App by server 130 in the example of FIG. 3:
server-location: http://mobilesiteclone.com/ex1
filePath: ./main/intro.html
size: 100
mod-date: 2010-12-11-23:54:20
filePath: ./main/about.html
size: 120
mod-date: 2010-12-11-23:54:20
filePath: ./main/core.js
size: 198
mod-date: 2010-12-11-23:54:20
filePath: ./main/style.css
size: 299
mod-date: 2010-12-11-23:54:20
filePath: ./main/catalog.pdf
size: 2000000
mod-date: 2010-12-11-23:54:20
deferred: YES
filePath: ./product1.zip
compressed: YES
filePath: ./product2/page2.html
size: 2000000
mod-date: 2010-12-11-23:54:20
deferred: YES
filePath: ./product2/movie2.mv4

```
size: 3000000
mod-date: 2010-12-11-23:54:20
source: http://vidoeserver.com/ex1/product2/movie2.mv4
deferred: YES
filePath: ./product2/doc2.pdf
size: 120000
mod-date: 2010-12-11-23:54:20
source: https://docserver.com/ex1/product2/doc2.pdf
source-credentials: usernameXX:encodedPassWordYY
deferred: YES
```

In the FIG. 3 example, the example file list is processed by the mobile application engine 110 when the POW App is downloaded to the mobile device 100 to update the virtualized file directory on the mobile device. In particular, during installation of the POW App example of FIG. 3, the example file list is examined for files in the initial download:

./main/intro.html—downloaded.
./main/about.html—downloaded.
./main/core.js—downloaded.
./main/style.css—downloaded.
./main/catalog.pdf—marked as deferred, so it is not downloaded.
./product1.zip—compressed directory downloaded and expanded.
./product2—all files in this directory marked as deferred, so they are not downloaded.

The virtualized file system is updated to reflect these characteristics as represented by the augmented file attributes. As appropriate, file attributes are updated to reflect the new values.

When the user references the following files in the example of FIG. 3, they will be downloaded. Also scripts attached to buttons can also activate the downloading. If the deferred content is already on the device and up to date with the contents on the server, the deferred content is not re-downloaded:

./main/catalog.pdf—downloaded when referenced
./product2/page2.html—downloaded when referenced
./product2/movie2.mv4—downloaded when referenced from server http://videoserver.com
./product2/doc2.pdf—downloaded when referenced from secure server https://docserver.com. User credentials are kept in an encoded format for additional security.

When an update is requested, the file list on the mobile device 100 is compared against the possible updated list from the server 130. Files that are no longer in the server list are deleted from the local store. Files that are determined to be modified, by comparing file size/date/checksum or unique id, are downloaded. For deferred files, only those files already downloaded on the mobile device 100 are checked for update.

Figure 4:
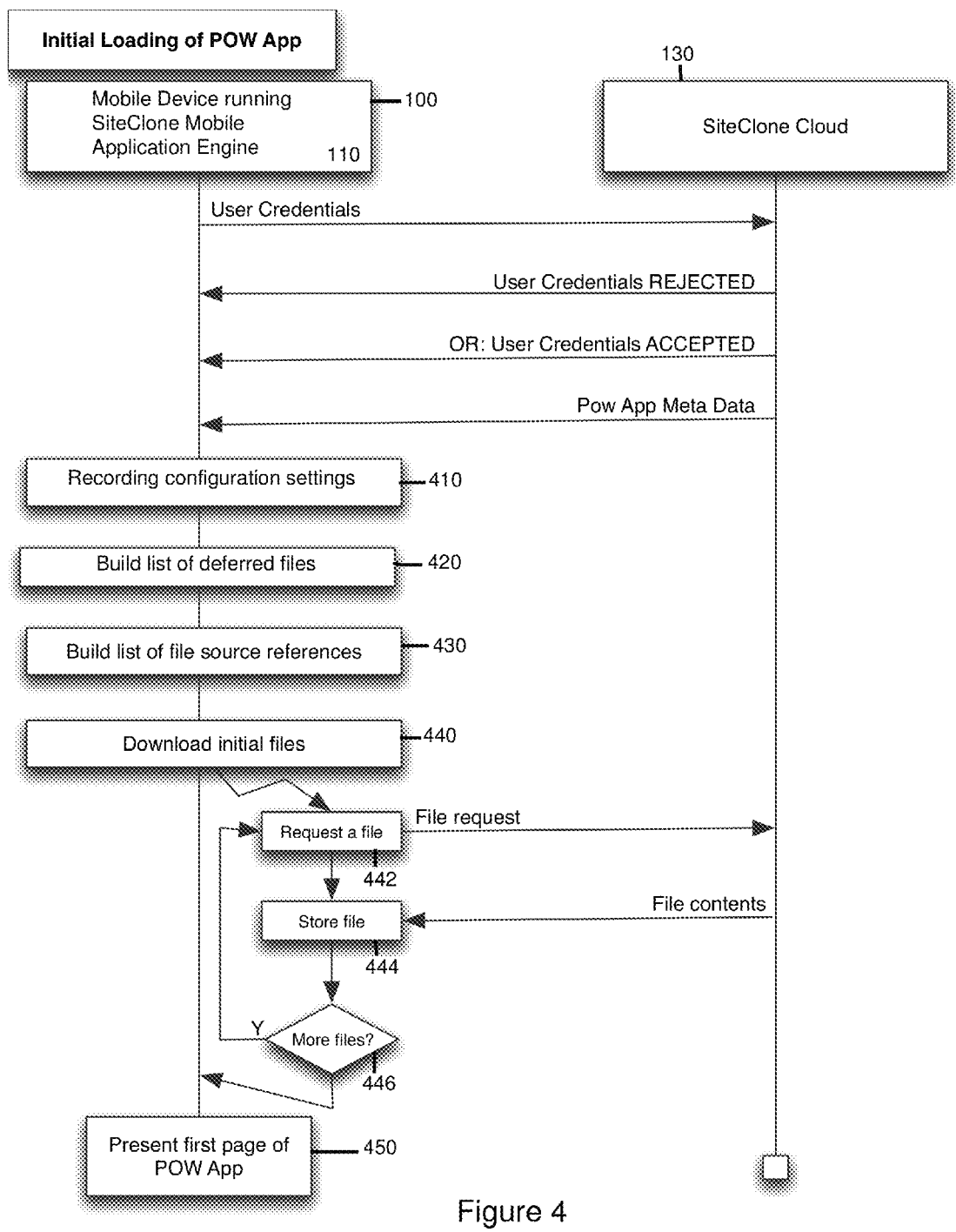
FIG. 4 illustrates the flow of mobile data management software implemented on a user's mobile computing device for the initial loading of Personalized Off-Line Web (POW) applications in accordance with the methods of the invention.

FIG. 4 illustrates the flow of mobile data management software implemented on a user's mobile computing device 100 for the initial loading of Personalized Off-Line Web (POW) applications in accordance with the methods of the invention. The mobile data management software (application engine) 110 of the invention is loaded into the mobile computing device 100 and functions to manage and control secure content accessible online and offline by the mobile computing device 100 using server managed, mobile application parameters, user controlled settings, and Javascript initiated application commands. Access to content initially stored on one or more servers 130 is initiated by the mobile application engine 110 sending application credentials to the server 130. If the server 130 is not setup for accepting credentials from application engine 110, or if the user credentials are rejected for any reason, the mobile application engine 110 may retry or give up. If server 130 is a server setup for use with the application engine 110 and the user credentials are accepted, the server 130 requests user data including an individual's login, user configuration parameters, user access logs, user offline completion, and the like. If user login is validated, the server 130 returns POW application metadata such as the secure location of the file list(s) unique to the user or group and unique application settings and/or parameters. In an exemplary embodiment, these parameters may include a list of file extensions (augmented file attributes) for the application not to download on initial file download.

Upon receipt of the POW application metadata including the augmented file attributes, the application engine 110 records the configuration settings at 410, builds a list of deferred files at 420 that are to be downloaded at a later time, and builds a list of file source references as a virtual directory at 430. Mobile application engine 110 builds such lists by accessing the file list(s) or generating its own through crawling, FTP to extract information, populate fields based on file relationships, or other methods known to those skilled in the art. The method the mobile application engine 110 uses to get the file list is set by the parameters sent by the server 130 or embedded in the POW App being run on the mobile computing device 100. The file list includes, for example, the file source time date stamp, the file's access record, the file's local destination, and the relative or absolute remote source of the file. At 440, the mobile application engine 110 starts to download files that have extensions that are not set as a deferred file or are not set as deferred in the file list. This is accomplished by requesting a file from the server 130 at 442 and storing the downloaded files in a local file list with the files original time date stamp and other file parameters at 444. The process is repeated at 446 if more files are desired by the mobile application engine 110. A deferred file list is generated at 420 that includes all of the files with file extensions that were set to deferred. Upon user selection, or automatically, the first page of the POW application is presented to the user on the user's mobile computing device 100 at 450. In an exemplary embodiment, three file lists are maintained throughout the application's use, namely, the latest remote file list that was accessed at last synchronization, the current local file list, and the deferred file list. The list of references stored locally on the mobile computing device 100 may include, for example, the file relative path, the last reference date, and the reference count to the file content.

Figure 5:
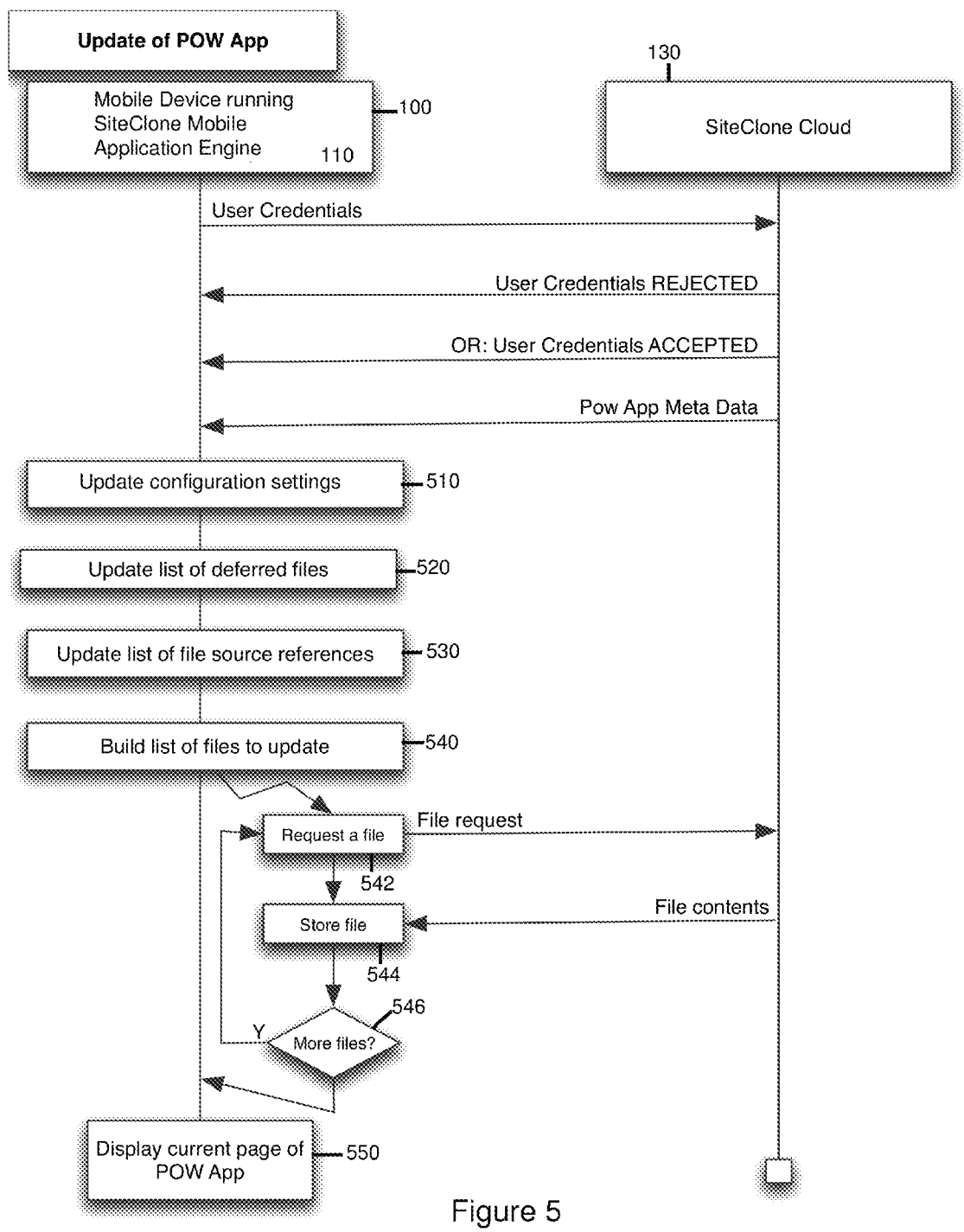
FIG. 5 illustrates the flow of mobile data management software implemented on a user's mobile computing device for the updating of Personalized Off-Line Web (POW) applications in accordance with the methods of the invention.

FIG. 5 illustrates the flow of mobile data management software implemented on a user's mobile computing device for the updating of Personalized Off-Line Web applications (POW Apps) in accordance with the methods of the invention. This flow is essentially the same as that of FIG. 4 except that, in this case, the mobile application engine 110 accesses the server 130 to update the configuration settings at 510, the list of deferred files at 520, the list of file source references at 530, and builds a list of files to update at 540. Upon storage of the update file(s) at 544, the synchronization is complete and the current page of the POW application may be displayed.

Those skilled in the art will appreciate that the user may be prompted to update the content based on published settings. This content could contain simple directories of files or a complex HTML(s) site with all supported media. Even in such a case, when the content is downloaded, there is no delay, and important published content is accessible when needed, even in the absence of a connection to the Internet.

Figure 6:
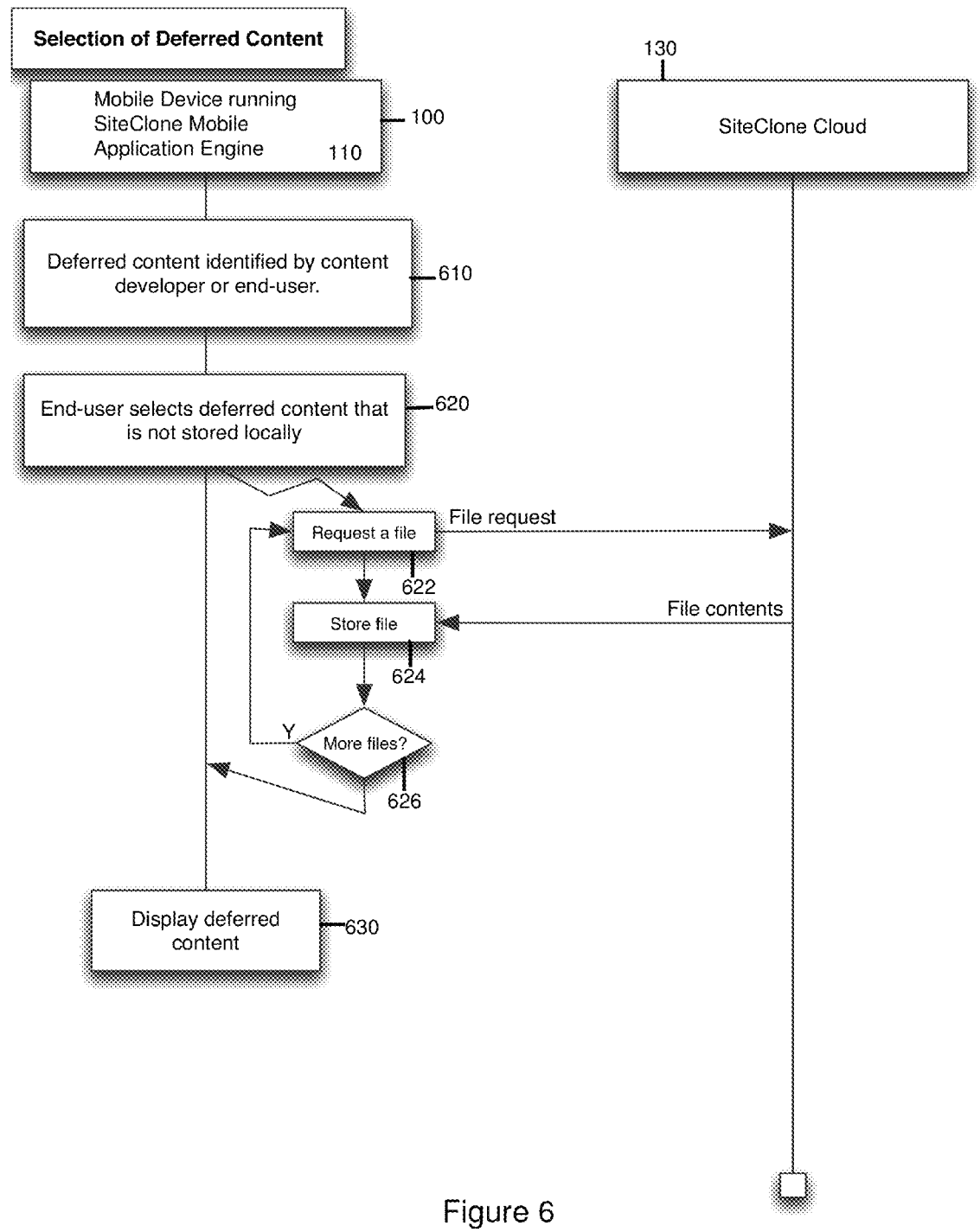
FIG. 6 illustrates the flow of mobile data management software for accessing HTML content on a user's mobile computing device with deferred content in accordance with the methods of the invention.

FIG. 6 illustrates the flow of mobile data management software for accessing HTML content on a user's mobile computing device with deferred content in accordance with the methods of the invention. In this case, the HTML content stored on the mobile computing device 100 is run locally on the mobile computing device 100. The compiled application handles relative links of non deferred content per the application developer's program. During operation of the POW App, the user clicks at 610 on a function programmed by the content developer in HTML, Javascript or CSS that has a link to a file with a file extension set to deferred. The application processes the link by checking the local storage list. If the file exists, the application engine handles the file per application design. However, if it is determined at 620 that the selected file does not exist locally, the application checks the application's database of source files prepared by the server 130 or by the mobile application engine 110 to find the server source path of the selected file, credentials to access on a protected server (optional), and the key to decrypt the file (optional). The mobile application engine 110 also checks the download priority list to prioritize download based on the settings provided by the application developer, the content publisher, or the end user. If the requested file is not stored locally, the file is requested from the server 130 at 622 and the downloaded file is stored in a local file list with the file's original time date stamp and other file parameters at 624. The process is repeated at 626 if more files are desired by the application engine 110. The requested deferred content is then displayed at 630.

Figure 7:
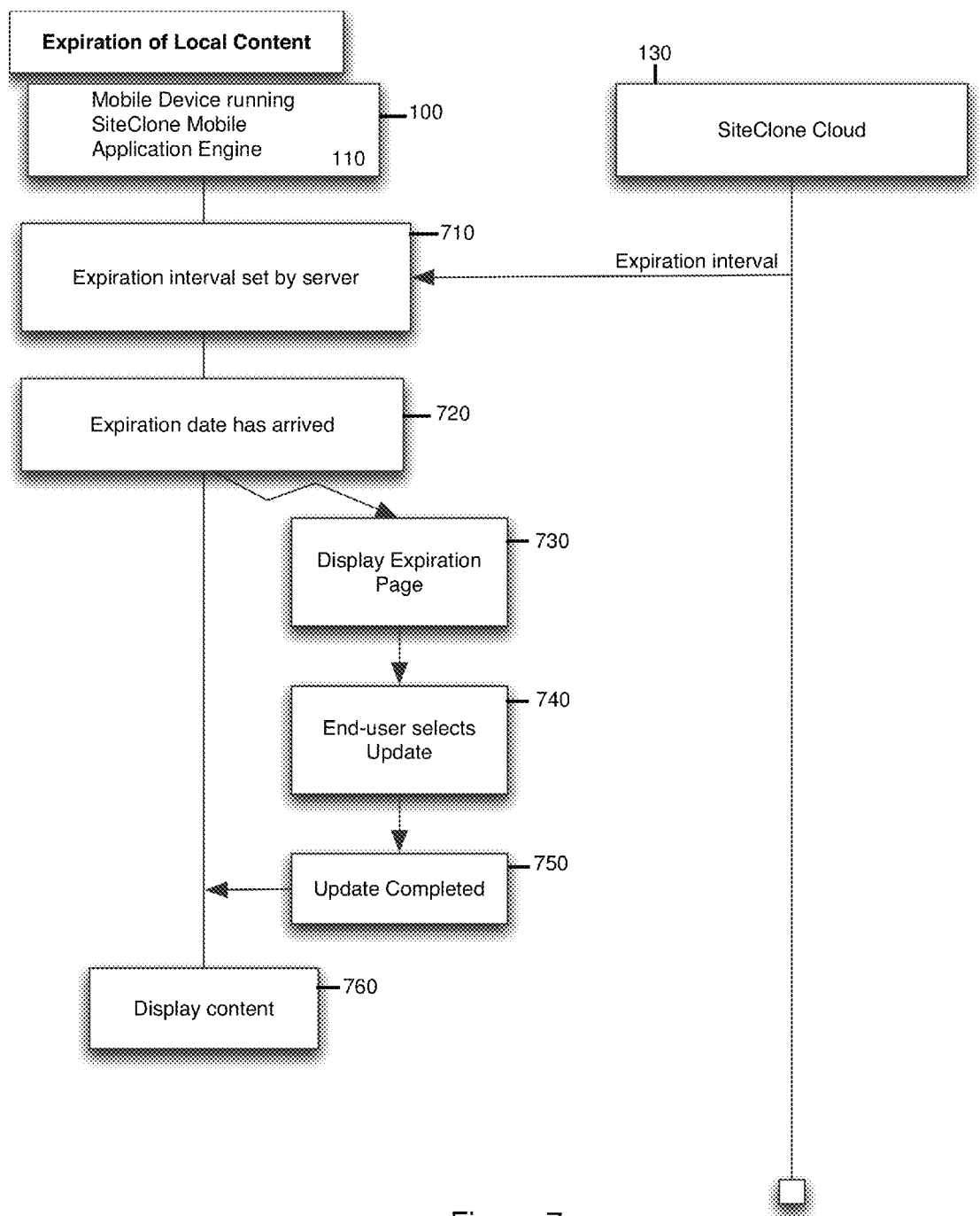
FIG. 7 illustrates the flow of mobile data management software for enabling a user to specify an expiration interval for performing a full update of the HTML content on the user's mobile computing device in accordance with the methods of the invention.

FIG. 7 illustrates the flow of mobile data management software for enabling a user or content manager/publisher to specify an expiration interval for performing a full update of the content on the user's mobile computing device in accordance with the methods of the invention. In particular, the server 130 may specify an expiration interval for expiration of the local content stored on the mobile computing device 100 at 710. If it is determined at 720 that this interval has lapsed before a full update is performed, an expiration screen is presented to the end user at 730 until the user selects to update (FIG. 5) at 740, and a full update is performed at 750. Once a full update is performed, the end-user is allowed to view the content at 760. This expiration interval is again managed using configuration settings stored in server 130 that may be managed by the user of the mobile application engine 110.

During operation, the system of FIG. 1 enables the mobile computing device 100 to issue a request to one or more servers 130 to, for example, validate a user, register a user, or update or view statistics. All such requests typically contain server request parameters such as user name, user (encoded) password, device attributes such as device unique ID, device model, local disk usage, and performance stats such as number of syncs and number of failed syncs, and client POW App key/value pairs. The POW App metadata provided in a typical response from the server 130 include server-to-client configuration parameters such as content expiration period and content update interval, as well as file references such as a list including file relative path, whether the data is deferred, a source reference (relative or absolute HTTP/HTTPS), and validation fields such as file date, file size, unique tag, and check sum. The POW App metadata may also include compressed directories and/or deferred items such as those selected by global file extension match.

Figure 8:
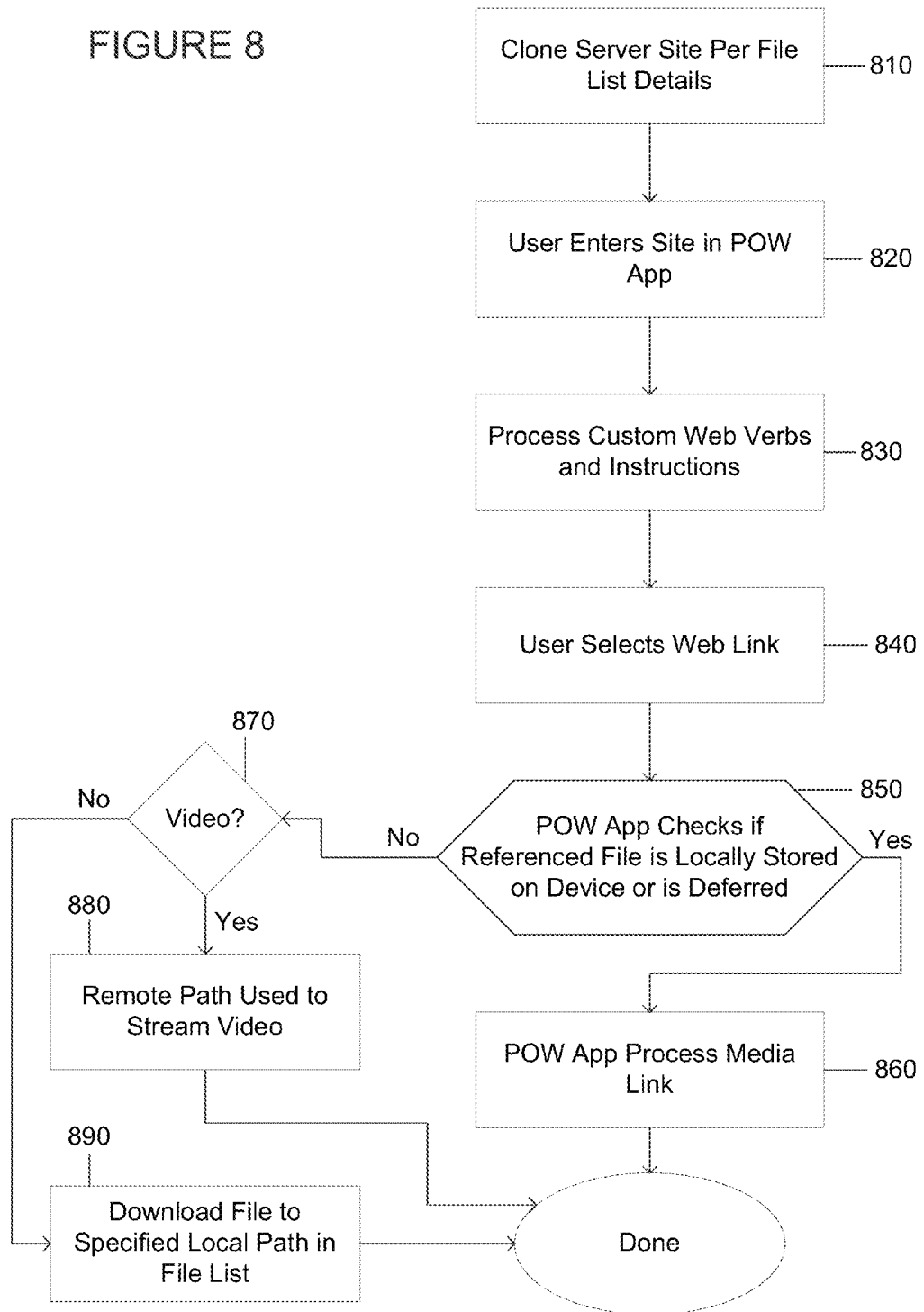
FIG. 8 illustrates the processing of content by the POW applications using the mobile data management software on a mobile computing device in accordance with the invention.

FIG. 8 illustrates the data file processing using the mobile data management software on a mobile computing device using HTTP(s) in accordance with the invention. As illustrated in FIG. 8, a POW App processes content by cloning the selected server 130 site based on File List details at 810 and entering the site in the POW App at 820. The index.htm file is displayed and any custom web verbs (with associated augmented file attributes) and instructions are processed by the mobile application engine 110 at 830. The page can render with both locally stored and remote content. The user then selects a web link at 840. the POW App checks at 850 if the referenced file is locally stored on the mobile computing device 100 or if it has been deferred. If locally stored or deferred, the POW App processes the media link at 860, which could be video, PDF, DOC, XLS, PPT, Keynote or the like. The process is then complete. However, if it is determined at 850 that the referenced file is not locally stored, the POW App checks at 870 whether the file is video. If so, the remote path is used to stream the video at 880. When the user if finished viewing the video, the user is asked if he/she wants to download the video to local storage for playback offline later. Other types of deferred files including, but not limited to PDF, DOC, XLS, PPT and Keynote files are downloaded immediately at 890 to the specified local path in the file list and the user is notified when the files are ready to be viewed. Any on-demand, selective caching is automatically handled by the POW App. The content manager/publisher may also employ web verbs that allow the user to choose groups of deferred files to be downloaded for future, offline viewing. Processing of the content is then complete.

Figure 9:
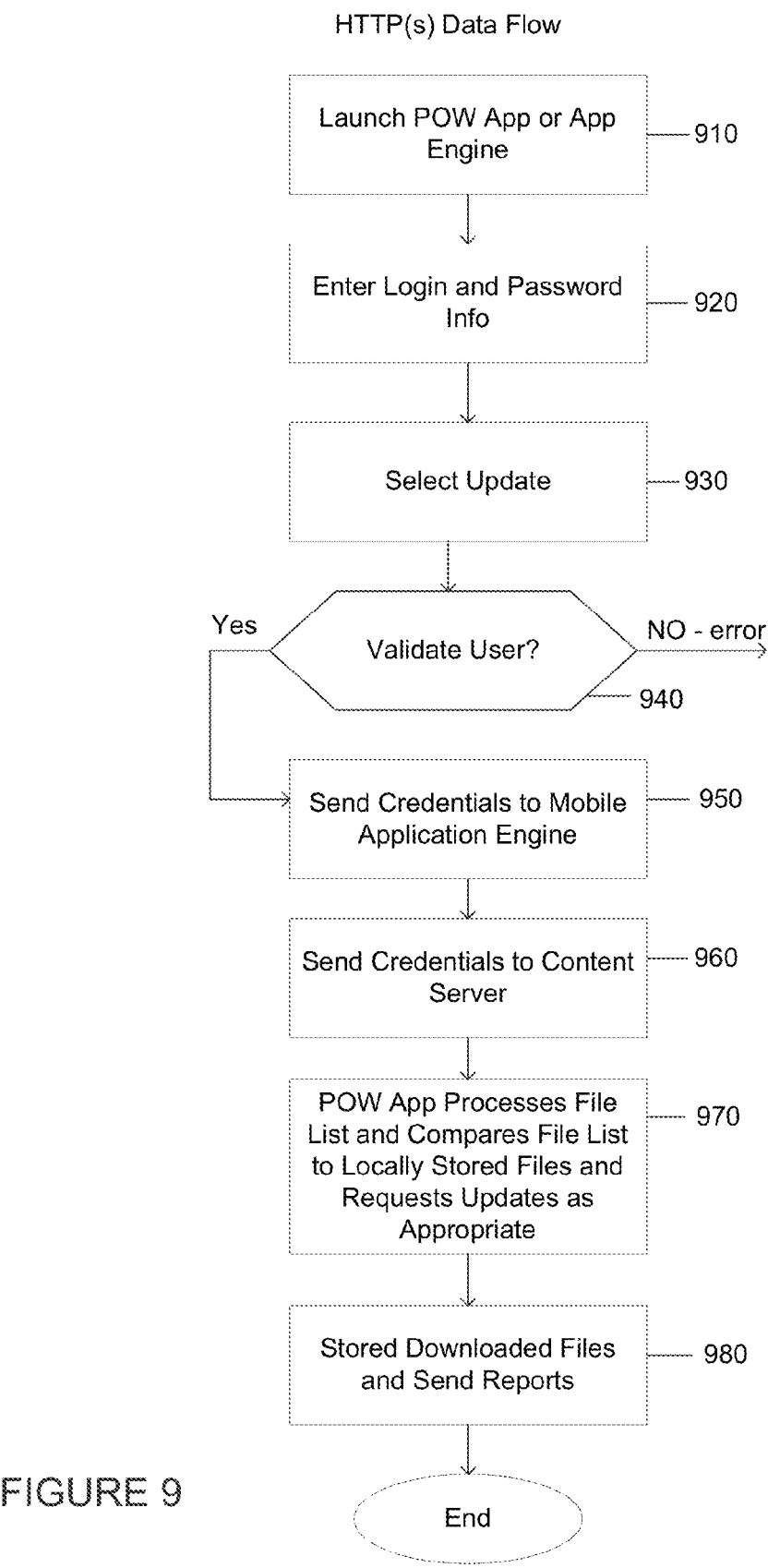
FIG. 9 illustrates data flow using the mobile data management software on a mobile computing device in accordance with the invention.

FIG. 9 illustrates data flow using the mobile data management software on a mobile computing device in accordance with the invention. The end user (content consumer) having the mobile application engine 110 loaded onto his/her mobile computing device 100 downloads a browser or branded application that gives the user access to the content he/she requires. Depending upon how the content manager/publisher developed the content and setup the user database (e.g., which configuration parameters were used), the user would be able to access the content using at least one of the following methods:

(1) The user may type in a URL into the browser or branded application;

(2) The user may enter a user name and password in the POW app;

(3) The user may select a link in his/her email program that was sent to the user by the server 130 to configure the POW app for any type of access;

(4) The user may select a link on an Internet page using his/her browser and the POW app will open and configure; or (5) The user would self-register from the POW app side.

Once the mobile application engine 110 or the branded POW App launches at 910, the user enters login and password information (if he/she has not already done so) at 920. The user selects an update at 930 and credentials are sent along with the device and application information over a SSL secure socket connection to the server 130 via network 120. The validation server 131 then validates the user by checking the user's credentials, the application ID, and the device ID at 940. If the user is not validated, an error message is returned. However, if the user is validated, then based on the user's group or individual assignments, content credentials or the FileList are sent to the mobile computing device 100 by validation server 131 at 950. Next, at 960, the POW App sends over a SSL secure socket connection credentials to the content server 135, which responds with a formatted file list that contains destination path and remote path data if different. The POW App processes the file list at 970 and compares it to locally stored files and cue files and requests files from server 130 that are not up to date on the mobile computing device 100. The server 130 returns files to the POW App and the mobile computing device 100 stores completed downloads to a specified directory at 980. The POW App reports when all downloads are complete. If the session is interrupted, the partially completed download cue is completed with the next update as appropriate. As noted above, various configuration parameters control update notices, update interval requirements, and deferred files and data expiration.

Other functions supported by the system of FIG. 1 include synchronization initiated by the user of the mobile computing device 100 or the server configuration of the server 130. Also, password encoding can be locked to a specific web application downloaded from the server 130 to the mobile computing device 100. The system of FIG. 1 also may support offline view and tracking and test taking as well as user or local initiated download of deferred content and local notification of expired content and full synchronization.

The system of FIG. 1 also supports security features that provide additional security. For example, server 130 may be provided with a server key and a server ID without HTTPS overhead. Also, the server 130 supports access password encoding where the encoded password can only be used in the chosen communications protocol and cannot be used if accidentally exposed in other programs (FTP client or web browser) to access content. The server 130 can encode the passwords so that the FTP settings cannot easily be used in another FTP client or even another instance of the mobile application engine 110. In addition to the option of encoding passwords, the system also may email a message containing a corresponding URL that may then launch the mobile application engine 110 on another mobile computing device 100 with the FTP settings. Only encoded passwords would be included in such emails. In this fashion, the content manager/publisher and user may share access to a web site without exposing the FTP password. The password also can be retired by using different secrets. The server 130 also supports selective encoding of local files whereby a local web script may be used to decode and execute the local files to obtain the file contents. Further encoding of credentials and local files may be performed using a secret and a random seed such that each encoding is different and/or reversible with a fixed storage overhead and has a modest n-byte random seed overhead. Also, since these security features may be controlled by the content manager/publisher, the content manager/publisher may decide what sites, pages, and media is accessible to particular users and at what level. The content manager/publisher may also track users, view reports on usage, and even block certain users. In this fashion, the content manager/publisher may deliver content while maintaining control of the distribution of the content.

For another level of security, the software on the server side can be configured to place the FTP credentials and other configuration information in an HTTP password protected folder on the web site of the server 130. This folder is then accessed to obtain FTP credentials upon receipt of a user request. To configure the server 130 in this manner, the web site manager or content manager/publisher must first decide what level of control to put on the server 130. A basic level of control would simply have FTP credentials and settings return from a static configuration file. At a later time, the web site manager or content manager/publisher may decide to update the contents of the file to point to another FTP area or adjust some of the parameter settings. The next level of control would use a server side script to log each instance of access to the site so that the web site manager or content manager/publisher may monitor which devices are using the site. Finally, the content manager/publisher can require users to register with a user name and password before using the site so that future access can be checked against the original user name and password whereby usage statistics may be maintained in the usage database 134.

The validation server 131, usage server 133, and content server 135 together allow the content manager/publisher and/or web site manager to keep tabs on access to the web server 130 by tracking who has access to the site at all times. This is accomplished by having the validation server 131 verify user logins and register new users and for the usage server 133 to log user activity. For example, server 130 may support "Access Server Scripting" whereby a mobile application engine 110 instance queries an access directory of user credentials database 132, pass in device and user login information, and expect a specifically formatted response. A server-side script will verify the login information, register new users, and/or log the activity. Also, since the server 130 determines the choice of index file, the script in the index file can be in any language or be a static index.htm file. The script invoked by the server can be index.php, index.html, etc. The server-side script typically returns the settings to be used by the instance of mobile application engine 110.

The server-side script in the access directory of server 130 also may provide "Access Logging" without checking passwords. This is done by simply logging the access in the usage database 134. The mobile application engine 110 will pass the user name, encoded password, device name, device ID number, and application version to the server 130, which can accept the request and log it, returning new FTP credentials, or the server 130 can reject the request to prevent the user from downloading any new files.

For added protection, the access directory of server 130 also may have an HTTP user name and encoded password. It is noted that different parameters are needed to pass an unencoded site password. Typically, the site administrator will email the URL to a user's mobile computing device 100, and the user will click on the URL link to launch the mobile application engine 110. On the first launch, the user will be presented with a settings screen where the user can register a user name and password. In future operations, the server 130 will be asked to validate the user's credentials.

Sample Configuration

The system described herein may be used to manage and distribute a large amount of interactive training materials and videos to a mobile sales force while providing more immediate access than a conventional laptop computer could provide. The content manager/publisher could use the configuration settings (augmented file attributes) for the materials stored on server 130 to provide control over access to the contents as well as to enable regular updating of any remote content with little effort. The training materials may be distributed to users' mobile computing devices 100 and tracked. After signing on, the users may use the techniques described herein to update the mobile devices 100 with the latest materials. Content access is controlled by the configuration settings as reflected by the augmented file attributes, and user accounts are activated or deactivated as needed. Alternatively, a custom export file may be developed that can be downloaded and synchronized to the users' mobile computing devices 100.

Those skilled in the art will appreciate that the configuration settings described above may also be used by the content publisher to update content and to manage access by users to create a complete delivery platform. Whether the content is for public distribution or contains proprietary information targeted to a handful of users, the configuration settings for the content files stored in database 136 of server 130 may be set to limit user access. For example, essential content may be made available to employees and customers when and where they need it by designating the essential content as content that is stored locally on the users' mobile computing devices. Moreover, the content manager/publisher or website owner may use the system described herein to publish dynamic content that is accessible to specified users or groups of users that are granted access using the appropriate configuration (augmented file) settings. Thus, the essential content (which may be customized) is available in a default interface or in a modified interface even when Wi-Fi or other modes of Internet access are not possible. The configuration (augmented file system) settings thus permit users as well as content providers to manage and update mobile content in an easy, reliable manner.

In exemplary embodiments, the system described herein may provide a level of control to the user and content developer when making media available. For example, as noted with respect to FIG. 8, video may be streamed from a server when clicked in a webview. After the streaming movie is played, the user may be given the option to download the video. Similarly, the playback of an audio file may be controlled by the user by specifying a file name in the current directory or a relative path name. The playback continues until stopped or paused and even continues when a new page is loaded in the webview. Playback stops when the webview is closed. Audio play also may stop when a video file is played but can be continued after pausing. Web verbs and augmented file attributes as described herein may also be used to get the current time and other information by supplying the name of a function that will be called with playback status, the current time in seconds, and the total duration of the audio in seconds. Another web verb may be used to get notification of playback completion by setting the name of a function to call when the audio finishes playing. A web verb may also be used to change the current playback time and to specify a new time in seconds.

Those skilled in the art will appreciate that the mobile computing devices 100 and servers 130 may include computing environments implemented by a computer, a mainframe, a server, or the like. According to the illustrated embodiments, the computing environment includes mobile computing devices 100 such as smartphones and servers having hardware components and/or software components such that the resulting computing environment may be used to execute applications such as internet applications, operating systems, server applications, client applications, database applications, or the like. For example, the computing environment on mobile computing device 100 may be used to execute the mobile application engine 110 and POW apps implementing the methods described herein with respect to FIGS. 1-9.

In an exemplary embodiment, the mobile computing device 100 and the server 130 each include a processor that may be in operative communication with an instruction memory (both not shown) with instructions for implementing an operating system and application programs for implementing the techniques of the invention. The processors may include a standardized processor, a specialized processor, a microprocessor, or the like. The processor executes instructions including, for example, instructions for implementing the processes described with respect to FIG. 1-9.

Respective instruction memories (not shown) store the instructions that may be executed by the processors of the mobile computing device 100 and the server 130. The instruction memories may include computer readable storage media in the form of volatile and/or nonvolatile memory such as random access memory (RAM), read only memory (ROM), cache, Flash memory, a hard disk, or any other suitable storage component. In one embodiment, the instruction memory may be a separate component in communication with the processor of the mobile computing device 100 or server 130, while in another embodiment, the instruction memory may be integrated into the processor of mobile computing device 100 or server 130.

Use Scenarios

Compressed Files Scenario

A content manager uses the system described herein to build a medical catalog that is delivered over the web to mobile devices. The content includes web pages, movies, and audio lectures. To insure a smaller download size, selected portions of the content are compressed. In this scenario, the user begins with the content as it appears on the content server 130:

Medical Catalog Example M1
    Intro Screen S1
        Medical Info *compressed*
            Product Screen A1
            Product Screen A2
            Movie A3
            Audio A4

Based on the POW augmented file attribute values, the folder Medical Info is stored on the server 130 as a single compressed file. When it is downloaded, the mobile application engine 110 will decompress it. The Intro Screen S1 contains links that gives the end user access to the web pages, A1 and A2, and media files, A3 and A4.

The end user accesses the medical catalog by installing the mobile application engine on his/her mobile device 100 and logs on to the validation server 131 of server 130. The validation server 131 returns the Medical Catalog Example M1 POW App. The mobile device 100 receives the POW App and prompts the user to download the initial content. The end user responds OK to the initial download, and the mobile application engine 110 the individual files based on the file attributes (including the augmented file attributes). The Medical Info compressed file is decompressed and the individual files contained in it are available to be referenced.

Custom Media File Playback Scenario

A content manager uses the system described herein to build a medical catalog that is delivered over the web to a mobile device. The material consists of web pages, movies, and audio lectures. In this case, the content is not compressed. The content appears on the content server as follows:

Medical Catalog Example M1
    Intro Screen S1
        Medical Info
            Product Screen A1
            Product Screen A2
            Movie A3
            Audio A4

Based on the POW augmented file attribute values, the folder Medical Info is stored on the server 130 as a single compressed file. When it is downloaded, the mobile application engine 110 will decompress it. The augmented virtual file system will record the file date of the source compressed directory in order to check when the compressed directory is updated on the server. The Intro Screen S1 contains links that gives the end user access to the web pages, A1 and A2, and media files, A3 and A4. The process is like the previous example except that from Product Screen A1, the end user selects a reference to Audio A4. The mobile application engine 110 recognizes the selected file as an audio file and starts the audio player module.

Deferred Files Scenario

A content manager/publisher uses the system described herein to build a medical catalog that is delivered over the web to a mobile device. The material consists of web pages, movies, and audio lectures. There are two main categories of end users: nurses and doctors. The content manager needs to design a POW application that is suited for each type of end user. It is not realistic to include all the possible media in the initial download of the POW app since it would then take too long to download. The content manager/publisher faces the challenge of structuring the catalog so in the initial download are a common set of files that are relevant to all users, and the end user has the ability to download other content that he/she is interested in.

Using the deferred and streaming file capabilities made possible using the augmented file attributes, the content manager/publisher can accomplish this. In this example, the following is an outline for the Medial Catalog POW App as it appears on the content server:

Medical Catalog Example M2
  Intro Screen 1
    Medical Info
      Product Screen A1
      Product Screen A2
      Movie A3
      Audio Slide Show A4
    Nurse Info
      Nurse Product Screen B1 *deferred*
      Nurse Product Screen B2 *deferred*
      Nurse movie B3 *deferred*
      Nurse Audio slide show B4 *deferred*
    Doctor Info
      Doctor Product Screen C1 *deferred*
      Doctor Product Screen C2 *deferred*
      Doctor movie C3 *deferred*
      Doctor audio slide show C4 *deferred*

Based on the POW augmented file attribute values, the content manager/publisher specifies in the augmented file attributes that Nurse Info files (B1 to B4) and the Doctor Info files (C1 to C4) are deferred files, meaning they will not be part of the initial download. However, when the end user selects a deferred file, a prompt is issued to download the file and if the file is downloaded it will be included in future updates.

End User Nurse Smith Example 1

Nurse Smith accesses the medical catalog by installing the mobile application engine 110 on his/her mobile device 100 and logs on to the validation server 131. The validation server 131 returns Medical Catalog Example M2 POW App. The mobile device 100 receives the POW App and prompts the user to download initial content. Nurse Smith responds OK to the initial download and files A1 to A4 are downloaded onto his/her mobile device 100. From Product Screen A1, Nurse Smith selects a reference to Nurse Info file B1. From the augmented file attributes, the mobile application engine 110 recognizes file B1 as deferred and begins downloading. After file B1 download is completed, Nurse Smith is prompted to open file B1. Nurse Smith responds YES, and file B1 is presented to the end user. An update of the POW App will now include a check for a revised file B1 in addition to any changes in files A1 to A4. If any changes are detected, the new files are downloaded.

End User Doctor Jones Example 2

Doctor Jones accesses the medical catalog by installing the mobile application engine 110 on his/her mobile device 100 and logs on to the validation server 131. The validation server 131 returns Medical Catalog M2 POW App. The mobile device 100 receives the POW App and prompts the user to download initial content. Doctor Jones responds OK to the initial download and files A1 to A4 are downloaded onto his/her mobile device 100. From Product Screen A1, Doctor Jones selects a reference to Doctor Info file C3. From the augmented file attributes, the mobile application engine 110 recognizes file C3 as a movie and begins a stream playback of the movie. Doctor Jones decides it is a movie that should be kept on the device and selects Done to stop movie playback. The end user is prompted to download the movie since it is not yet stored on the device. Doctor Jones responds YES, and file movie C3 is downloaded. If Doctor Jones selects movie file C3 in the future, it will play back from the device.

Mini-Site Scenario

A content manager/publisher uses the system described herein to build a medical catalog that is delivered over the web to a mobile device. The material consists of web pages, movies, and audio lectures. To insure a smaller download size, selected a selected chunk of content, a mini-site, is marked as compressed and deferred. As such, the mini-site will only be downloaded when the end user selects a reference to a file located inside the mini-site. The content appears on the content server as follows:

Medical Catalog Example M3
  Intro Screen S1
    Medical Info *compressed* *deferred*
      Product Screen A1
      Product Screen A2
      Movie A3
      Audio A4

Based on the POW augmented file attribute values, the folder Medical Info is stored on the server 130 as a single compressed file. When it is downloaded, the mobile application engine will decompress it. The Intro Screen S1 contains links that give the end user access to the web pages, A1 and A2, and media files, A3 and A4.

The end user accesses the medical catalog by installing the mobile application engine on his/her mobile device and logs on to validation server 131. The validation server 131 returns Medical Catalog Example M1 POW App. The mobile device receives POW App and prompts the end user to download initial content. The end user responds OK to the initial download. The mobile application engine downloads the individual file Intro Screen S1. The Medical Info is not downloaded. The end user then selects a reference to Product Screen A1 from the Intro Screen S1. The mobile application engine 110 recognizes this as a reference to a deferred item that needs to be downloaded. The Media Info directory is downloaded and uncompressed. The Product Screen A1 is presented to the end user, and the end user selects a reference to Product Screen A2 from the Intro Screen S1. The file Product Screen A2 was part of the previous downloaded Media Info directory so it is simply presented to the end user.

Full Text Search Scenario

The content manager/publisher uses tools to create a full text search database and search key word lists of selected files on the server site. The search database links text to a relative path name of the file that contains the text long with the location in the file. For a text document, this would be the page and line number of the text occurrence. For a movie file, it would be the time code for the location of the speech containing the text. In this scenario, the content appears on the content server as follows:

Medical Catalog Example M4
  Intro Screen S1
  Search Database D1
  Search Keyword List K1
    Medical Info
      Product Screen A1
      Product Screen A2
      Movie A3
      Audio A4

In this example, the end user selects a search option and enters text to search. Javascript code in the POW App passes the search text along to the mobile application engine 110 along with the location of Search Database D1. The mobile application engine 110 returns found items to POW Javascript, which formats the search results for display. The end user selects one of the search results, and the POW Javascript locates the corresponding file and displays it.

Code Library Scenario

The content manager/publisher used the system described herein to create a reusable code library to presend an audio slide show as a sequence of images presented at specific times in an audio play back. In this scenario, the content is downloaded into the device as follows:

Medical Catalog Example M5
    Intro Screen S1
    Audio Slide Show Code Library L1
        Medical Info
            Product Screen A1
            Product Screen A2
            Movie A3
            Audio A4
            Image I1
            Image I2
            Image I3
            Image I . . .

In this example, the end user selects the slide show. Code in the POW App calls a routine in Audio Slide Show Code Library L1 with audio file reference, a list of images I1 to I . . . and a time code for each image. The routine calls the mobile application engine API to start playback of the audio. The routine monitors the time code from audio play back using the mobile application engine API and matches the time code with the image. The routine displays Image I1, I2, etc. when the time code associated with the image arrives.

Those skilled in the art also will readily appreciate that many additional modifications and scenarios are possible in the exemplary embodiment without materially departing from the novel teachings and advantages of the invention. For example, the software loaded onto the server 130 may further include content publishing software that manages when mobile computing devices 100 are alerted to updated content, that blocks users from viewing outdated content, controls access to particular content, and provides other server side settings. Accordingly, any such modifications are intended to be included within the scope of this invention as defined by the following exemplary claims.

What is claimed is:

1. A mobile computing device having a processor that executes instructions for enabling a user of the mobile computing device and/or a content manager/publisher to specify what code and/or content are to be stored locally on the mobile computing device for offline use and what code and/or content are to be stored remotely for online access, said instructions when processed by said processor causing said processor to implement a mobile application engine that:

processes a personalized offline web application comprising one or more web pages, web scripting code and at least one media file;

applies custom web scripting code extensions to web scripting code of the personalized offline web application, said custom web scripting extensions identifying whether the associated web scripting code is to be stored locally on the mobile computing device or stored remotely in a network to which the mobile computing device may be connected;

maintains a directory specifying where local files may be updated within said network when the mobile computing device is connected to the network;

monitors expiration intervals set for downloaded content, whereby the content is automatically updated from the network files specified in the directory the next time said mobile computing device is connected to the network; and displays said at least one media file of said personalized offline web application without a connection to said network, wherein the downloaded content has file attributes associated therewith, said file attributes being modifiable by a user of the mobile device and/or a content manager/publisher of the downloaded content files, said file attributes specifying at least whether the associated downloaded content is to be downloaded automatically with an associated web application or in response to a request at runtime of the associated web application, and said file attributes being used by the mobile computing device to augment a file system of the mobile computing device to specify sources within the network where the downloaded content may be updated when the mobile computing device is connected to the network and when the downloaded content needs to be updated.

2. The mobile computing device of claim 1, wherein the mobile application engine interprets the file attributes and implements the augmented file system using said file attributes.

3. The mobile computing device of claim 1, wherein the said custom web scripting code extensions are usable by the content manager/publisher to access and modify the augmented file attributes.

4. The mobile computing device of claim 3, wherein the custom web scripting code is embedded in html or javascript of the web scripting code.

5. The mobile computing device of claim 1, wherein said mobile application engine accesses and builds file lists from different server sources on the network.

6. The mobile computing device of claim 5, wherein said mobile application engine accesses and builds said file lists using at least one of FTP, HTTP, static lists, web crawling and server applications for said different server sources.

7. The mobile computing device of claim 1, wherein the web application provided to the mobile computing device reports usage statistics of associated content files back to the source of said content files or to a content management server.

8. The mobile computing device of claim 1, wherein the file attributes associated with a content file are sent to the mobile computing device as a separate text file from the content file and are linked to the content file by the file system of the mobile computing device.

9. The mobile computing device of claim 1, wherein the file attributes comprise at least one of the following file attributes: source of file content, credentials to access the source of file content, whether the file content should be downloaded as referenced or deferred for later access, whether the file is to be encoded before it is stored on the mobile computing device, whether the content file includes media that may be streamed from the source of the content file, whether the file may be emailed, whether the file can be printed, the expiration date after which the file contents may no longer be viewed, the update interval for the file, and whether the file may be opened using other mobile applications.

10. The mobile computing device of claim 1, wherein the mobile computing device maintains throughout use of the downloaded web application a file list of a latest remote file list that was accessed at a last synchronization with said sources within the network, a current local file list, and a deferred file list for files to be downloaded in response to the runtime request of the web application.

11. The mobile computing device of claim 1, wherein the file attributes are applied at a directory level, file level, or as specific attributes for different users or groups.

12. A mobile computing device having a processor that executes instructions for enabling a user of the mobile computing device and/or a content manager/publisher to specify what code and/or content are to be stored locally on the mobile computing device for offline use and what code and/or content are to be stored remotely for online access, said instructions when processed by said processor causing said processor to implement a mobile application engine that:
   processes a personalized offline web application comprising one or more web pages, web scripting code and at least one media file;
   applies custom web scripting code extensions to web scripting code of the personalized offline web application, said custom web scripting extensions identifying whether the associated web scripting code is to be stored locally on the mobile computing device or stored remotely in a network to which the mobile computing device may be connected;
   maintains a directory specifying where local files may be updated within said network when the mobile computing device is connected to the network;
   monitors expiration intervals set for downloaded content, whereby the content is automatically updated from the network files specified in the directory the next time said mobile computing device is connected to the network; and
   displays said at least one media file of said personalized offline web application without a connection to said network,
   wherein said custom web scripting code extensions comprise Javascript initiated application commands associated with the downloaded web application that allows the user to specify whether the downloaded web application and which of associated downloaded content files as to be stored locally on said mobile computing device and update intervals for updating any locally stored content files on said mobile computing device.

13. A mobile computing device having a processor that executes instructions for enabling a user of the mobile computing device and/or a content manager/publisher to specify what code and/or content are to be stored locally on the mobile computing device for offline use and what code and/or content are to be stored remotely for online access, said instructions when processed by said processor causing said processor to implement a mobile application engine that:
   processes a personalized offline web application comprising one or more web pages, web scripting code and at least one media file;
   applies custom web scripting code extensions to web scripting code of the personalized offline web application, said custom web scripting extensions identifying whether the associated web scripting code is to be stored locally on the mobile computing device or stored remotely in a network to which the mobile computing device may be connected;
   maintains a directory specifying where local files may be updated within said network when the mobile computing device is connected to the network;
   monitors expiration intervals set for downloaded content, whereby the content is automatically updated from the network files specified in the directory the next time said mobile computing device is connected to the network; and
   displays said at least one media file of said personalized offline web application without a connection to said network,
   wherein the file attributes comprise custom file extensions that are available to said application commands to enable management of said content files by a user of said mobile computing device.

14. The mobile computing device of claim 13, wherein the application commands comprise commands for enabling said mobile computing device to manage a virtual file directory on said mobile computing device for managing said content files, including syncing said content files to a source of said content files, and managing media streaming for content files containing streaming media.

* * * * *